Nov. 15, 1938.  W. C. ANTHONY  2,136,663

TIPPING MECHANISM

Filed June 25, 1937  2 Sheets-Sheet 1

Inventor
William C. Anthony
by Parker & Carter
Attorneys.

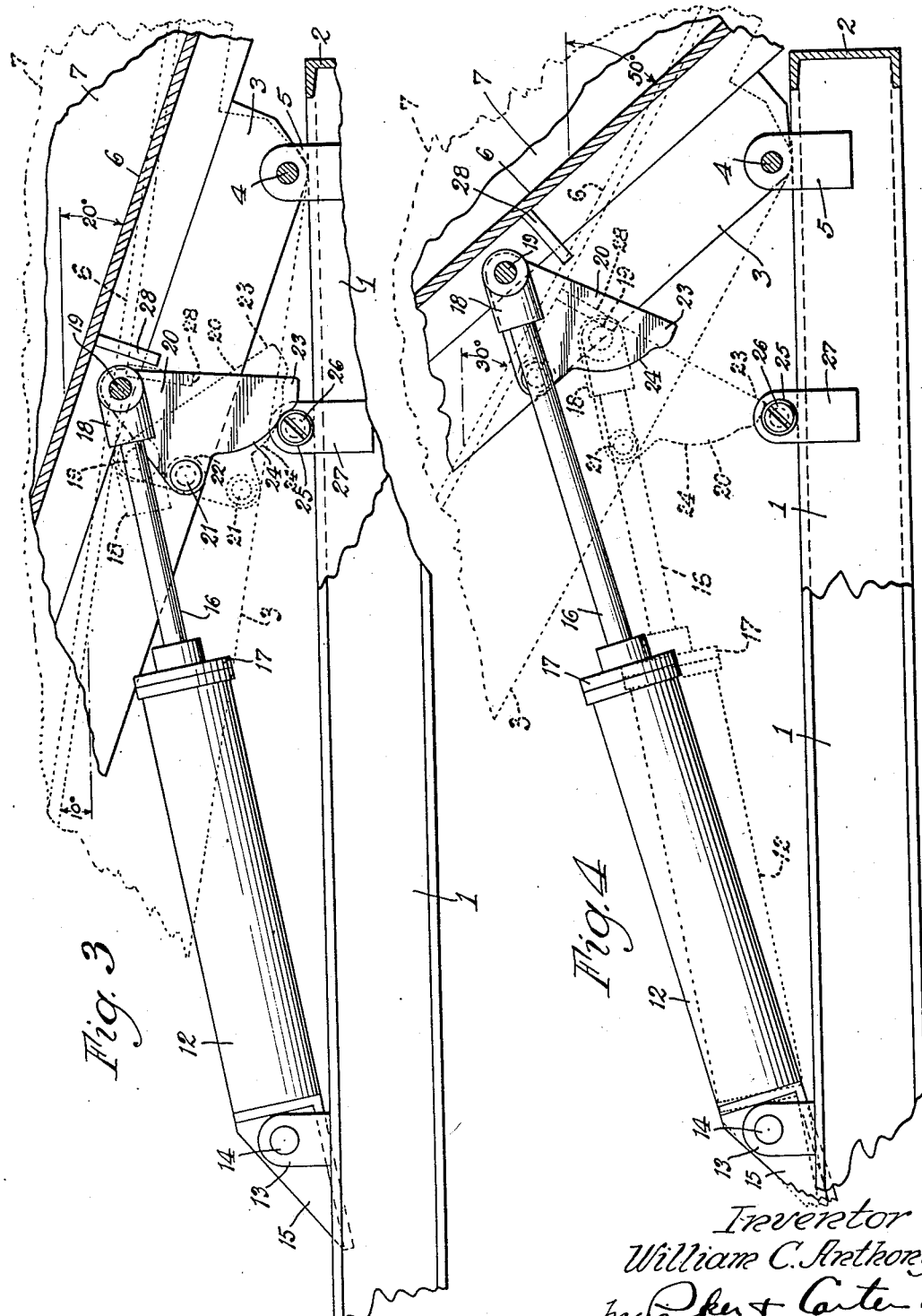

Patented Nov. 15, 1938

2,136,663

UNITED STATES PATENT OFFICE 2,136,663

TIPPING MECHANISM

William C. Anthony, Streator, Ill., assignor to Anthony Company, Streator, Ill., a corporation of Illinois Application June 25, 1937, Serial No. 150,281

8 Claims. (Cl. 298—22)

This invention relates to a receptacle and to means for dumping or tipping it. In the particular form shown it is adapted for use as a dumping or tipping body on a vehicle. It might be used otherwise and the invention is not limited to the association of the device with a vehicle.

One common form of use of this device is that in which it is mounted on an automotive vehicle such as a motor truck and in that case the engine of the vehicle, preferably, although not necessarily, actuates the power means for accomplishing the tip. Other special means might be used to actuate the power means.

The invention has for one object to provide in connection with a receptacle adapted to be tipped, a power mechanism for tipping it, characterized by an extreme low over-all height. Economy of space is almost always an advantage and where the device is mounted on a vehicle, such economy is of particular importance. Another object is to provide a device of the sort indicated in which the tipping mechanism lies entirely or almost entirely within the space bounded on top by the bottom of the receptacle to be tipped and on the bottom by the upper margin or upper surface of a supporting frame, whether the latter be a special frame or the frame of the vehicle.

Another object is to provide in connection with a tipping receptacle and means for tipping it, an arrangement of lever or other tipping mechanism characterized by the fact that for the earlier tipping increments the power means which may be a hydraulic cylinder and piston assembly accomplishes a relatively long movement for each increment of tipping, while during the latter stages it accomplishes a relatively short degree of movement for each tipping increment. This is of particular advantage where the power means is, as indicated, a hydraulic cylinder because it permits of the use of relatively low pressures within the cylinder. It is recognized that generally the first portion of the tip is the most difficult for, among other reasons, it is in this portion of the tip that the load is the heaviest. As the tip progresses, a greater and greater portion of the weight which is to be moved is shifted beyond the point of support of the tipping receptacle and thus the total weight which must be moved by the power source decreases as the tip progresses. It is, therefore, one of the objects of the present invention to provide a mechanism having this characteristic, that a long movement occurs for a given degree of tip in the early stages of tipping and a shorter movement occurs for the same degree of tip during the later stages of tipping.

Other objects will appear from time to time in the specification and claims.

The invention is illustrated more or less diagrammatically in the accompanying drawings, wherein:—

Figure 3 is a longitudinal vertical section taken at line 3—3 of Figure 2, on a further enlarged scale, with parts broken away and with parts in elevation, showing the body at a tip of 20°;

Figure 4 is a view similar to Figure 3, showing the body tipped until its bottom is disposed at an angle of 50° with respect to the horizontal.

Like parts are designated by like characters throughout the specification and drawings.

Figure 1:
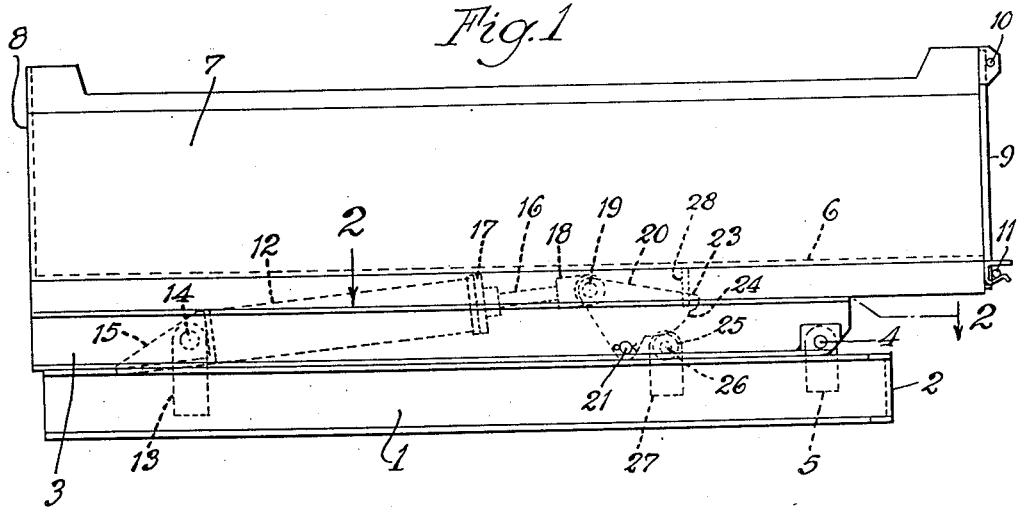
Figure 1 is a side view of one form of tipping receptacle and assembly.

The numeral 1 is a supporting frame which may be a separate or sub-frame or may be the chassis frame of a vehicle. It is composed of suitable side members which may have one or more cross members 2 to tie the side members together. As shown, only a single cross member 2 is provided.

3, 3 are the side or longitudinal members of the tipping frame. The cross member 4 may extend between these side members and join them. As here shown it is a rounded shaft-like member. The ends of the cross member 4 are supported in bearings formed in parts 5 which may be secured to the side frame members 1. A tipping platform 6 is supported on the frame members 3, 3. This platform may be flat or may, as in the present case, be formed as the bottom of a box having sides 7, a forward or front cross portion 8 and a rear or tail gate 9, which may be movable or might, if desired, be fixed or of any suitable construction. As here shown, the rear closure 9 is a tail gate pivoted adjacent its upper edge as at 10 and latched as at 11. The details of the receptacle and the side walls and end closures form no essential part of the present invention, which may be embodied in a platform or in a receptacle.

As one means for tipping or dumping the receptacle or platform, a hydraulic cylinder 12 may be used. This cylinder is preferably supported on bearing members 13 carried from some suitable point of support in the main frame 1, 2. They may be secured to the side frame members 1 or elsewhere as desired. A convenient means of mounting the cylinder for pivotal movement comprises a shaft-like member 14 which extends through or into and is supported by the members 13. Fluid under pressure is supplied to the cylinder by any means desirable. No particular means is here shown as its details form no essential part of the present invention. Ordinarily a pump, usually of a rotary type, is supplied and may be driven from the engine of the vehicle or from any other driving source. Frequently the pump is mounted as a unit with the cylinder and is supported, for example, on the extension 15 or some equivalent part of the assembly so that it conveniently moves with the cylinder. This arrangement is not essential.

A piston is mounted in the cylinder and is provided with a rod 16 which extends outwardly through a suitable opening in the cylinder head or closure 17. By means of a connection part 18 the piston may be connected to a cross member 19 which extends in part laterally of the tipping assembly and has pivoted at its outer ends levers 20. As shown these levers are irregularly shaped or generally triangular but they might be otherwise shaped. Each is pivoted for example upon a stud 21, carried in a suitable support 22, which in the particular form shown in the present case is each secured to a side frame member 3. With this arrangement of mounting each lever 20 is pivoted at one corner, or what might be called one corner, on a stud 21 and is movably connected to the cross member 19 at another end or corner, leaving a free end or corner 23; along the side which extends generally from the stud 21 to the end or corner 23 is provided a cam face 24. As here shown it is curved and it may be given any desired shape to accomplish the particular movement desired. Each cam face 24 is arranged to bear upon a rolling fulcrum member 25 carried on a stud 26 which is itself supported in a member 27 shown in the present case as secured to one of the side frame members 1. The stop 28 may be attached to the platform 6, if desired, and when used, prevents overturning of the lever 20, should the body tend to "run away" when in the tipped position.

Figure 2:
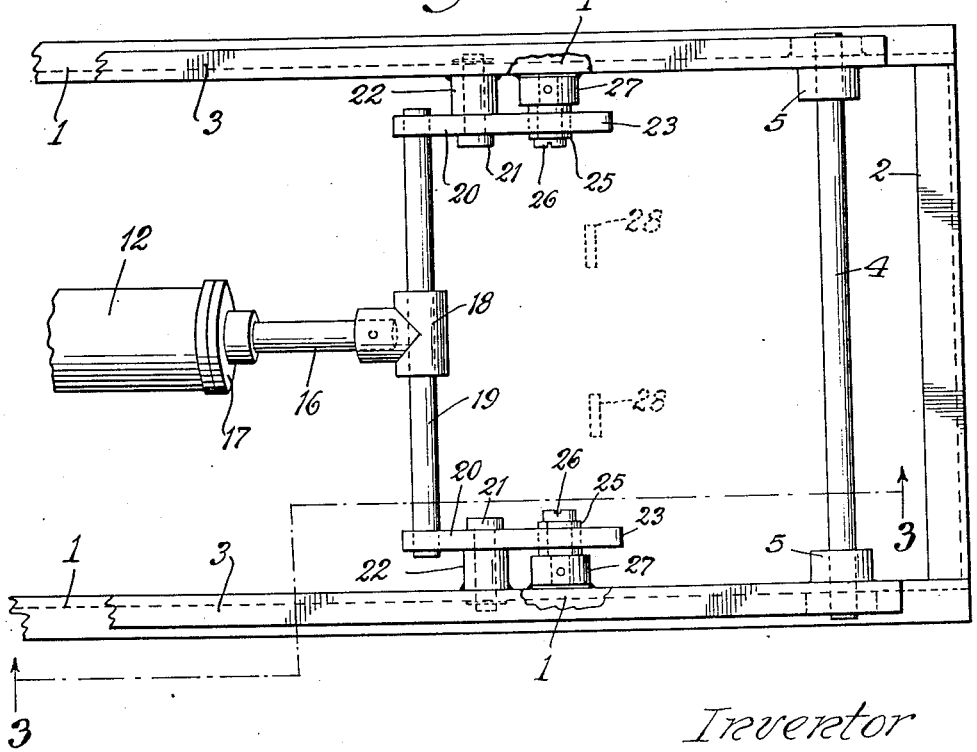
Figure 2 is a plan view on an enlarged scale taken at line 2—2 of Figure 1, with parts broken away and with the tipping receptacle omitted.

The use and operation of the invention are as follows:

When no tip or dump is occurring the parts are generally in the position shown in Figures 1 and 2, and this is true irrespective of the shape or details of the platform or receptacle which is to be tipped.

As stated above, in ordinary operation the heaviest load must be raised during the first portion of the tip. As one example it may be said that the heaviest load is carried in moving the receptacle or platform from a position of non-tip to a position of 20° tip. The initial or non-tip position is indicated in Figure 1. The dotted line position of Figure 3 is a 10° tip. It will be noticed that in that position the lever 20 has been moved until approximately the center point of the cam face 24 is in contact with the fulcrum roller 25. As the tip continues and the platform or receptacle bottom is moved from the dotted line position of Figure 3 to the full line position of that figure, which is a position of 20° tip, the cam moves further and as shown in full lines in Figure 3 approximately the outer or lower end of the cam face 24 is in contact with the fulcrum roller 25.

In the particular form of cam design shown herewith, as the dumping or tipping continues from the full line position of Figure 3 to the dotted line position of Figure 4, which is the position of 30° tip, the cam moves until approximately the point of the nose 23 is in contact with the fulcrum roller 25. Further tipping movement raises the lever 20 entirely out of contact with the fulcrum roller. It will be noticed from the dotted line position of Figure 4 that when the cam has been brought to the position where it is leaving or is about to break contact with the fulcrum roller, the center of the stud 21 and the center of the cross member 19 fall on a line drawn longitudinally through the center of the piston 16 or to express it another way, a plane drawn from the center of the cylinder pivot member 14 to the center of the cross member 19 will, as shown in the dotted line position of Figure 4, pass through the centers of the studs 21 and hence, as the lever member 20 leaves the fulcrum roller, the lifting force is acting in a straight line and the lever does not substantially jerk or snap into any new position because of being freed of its contact with the fulcrum roller. As the tipping continues to the maximum which may be any desired degree of tip, but which in the particular form indicated here is 50°, the alignment of the centers of the members 14, 21 and 19 remains unchanged. This has the advantage of causing smooth operating conditions.

Any desired means may be provided to prevent the body from tipping too far once it reaches or approaches its predetermined maximum. Means may be provided within the cylinder, such as springs or pressure fluid on both sides of the piston or mechanical checks or means may be provided for the body or any other part of the assembly. These details are not shown because the essence of the invention is independent of them.

The return movement from the tipping position may be accomplished by gravity or by force and in this return movement the parts move again to their original position and when the dotted line position of Figure 4 has been regained, the lever 20 contacts the fulcrum roller 25 and is thereafter rotated through its cycle of positions until it regains the original dotted line position of Figure 1.

As shown in Figure 4, one or more stops 28 may be applied to the body. This will limit the movement of the lever member 20 by being contacted by the cross member 19. For many purposes and where the parts remain in proper alignment the stop may not come into operation at all, but as the parts operate in tipping it will limit counterclockwise movement of the lever, for example, from the position shown in Figure 4, should the body suddenly tend to tip too far due to the shifting of the load or to other causes. Other stops may be applied if desired, to prevent improper operation of the lever 20, either in the dumping or in the returning movement.

I claim:

1. In combination, a load carrying and dumping assembly including a support and a member mounted on said support to be tilted and means for tilting said member, said means comprising a generally triangular cam lever, movably mounted adjacent one corner upon said member, a power source movably mounted upon said support and means for connecting it to a free corner of said lever to tilt the lever, and a fulcrum member supported on said support, said lever having a cam face adapted during an early portion of the tilting cycle to contact said fulcrum member and during a later portion of the tilting cycle being moved out of contact with said fulcrum member.

2. In combination, a load carrying and dumping assembly including a support and a member mounted on said support to be tilted and means for tilting said member, said means comprising a generally triangular cam lever, movably mounted adjacent one corner upon said member, a power source movably mounted upon said support and means for connecting it to a free corner of said lever to tilt the lever, and a fulcrum member supported on said support, said lever having a cam face spaced away from said two corners and adapted during an early portion of the tilting cycle to contact said fulcrum member and during a later portion of the tilting cycle being moved out of contact with said fulcrum member.

3. In combination, a load carrying and dumping assembly including a support and a member mounted on said support to be tilted, and means for tilting said member, comprising a generally triangular cam lever, said lever supported adjacent one corner upon said assembly for movement, a power source movably mounted within said assembly and means for connecting it to another corner of said lever for tilting, and a fulcrum member supported on said assembly, said lever having a cam face extending away from said two corners and adapted during an early portion of said tilting to contact said fulcrum member and during a later portion of the tilting to move out of contact with said fulcrum member.

4. In combination, a load carrying and dumping assembly including a support and a body tiltably mounted on said support, means for tilting said body, comprising a lever rotatably mounted upon said body and provided with a cam face, a power source movably mounted within said assembly and pivotal means for connecting it to said lever and for thereby tilting said lever, and a fulcrum member on said support, the cam face of said lever being opposed to said fulcrum member when said body is in initial lowered position, the length of said cam face being substantially less than the distance traveled by said lever with said body in the course of the normal lifting excursion of said body, whereby said cam face bears against said fulcrum member during an initial portion only of the dumping movement of said body, and is thereafter withdrawn from contact with said fulcrum member during a later portion of the dumping movement of said body, the pivotal connections between lever and body and between lever and power source being relatively spaced, the pivotal connection between lever and body constituting the sole connection between lever and body when the body is in raised position, whereby the entire thrust of the power source is directed through said connection against said body after said lever is withdrawn from contact with said fulcrum member in the course of the upward movement of said body.

5. In combination, a load carrying and dumping assembly including a support and a body tiltably mounted on said support, and means for tilting said body, comprising a lever rotatably mounted upon said body, a power source movably mounted within said assembly and pivotal means for connecting it to said lever and for thereby tilting said lever, and a fulcrum member on said support, the connection between lever and body and the connection between lever and power source being relatively spaced, said second connection, when the parts are in initial position with the body lowered, being located intermediate the power source and said first connection, and at a level above said first connection, a portion of the lever more remote from the power source than said first connection being provided with a cam surface which is initially opposed to the fulcrum, the length of said lever and cam surface being less than the distance traveled by the lever with the body in the course of a normal lifting excursion of the body, whereby the lever is withdrawn from contact with said fulcrum member during a terminal portion of the dumping movement of said body.

6. In combination, a load carrying and dumping assembly including a support and a body tiltably mounted on said support, and means for tilting said body, comprising a lever rotatably mounted upon said body, a power source movably mounted within said assembly and pivotal means for connecting it to said lever and for thereby tilting said lever, and a fulcrum member on said support, the connection between lever and body and the connection between lever and power source being relatively spaced, said second connection when the parts are in initial position with the body lowered, being located intermediate the power source and said first connection, and at a level above said first connection, a portion of the lever more remote from the power source than said first connection being provided with a cam surface which is initially opposed to the fulcrum, the length of said lever and cam surface being less than the distance traveled by the lever with the body in the course of a normal lifting excursion of the body, whereby the lever is withdrawn from contact with said fulcrum member during a terminal portion of the dumping movement of said body, said lever being generally triangular in form, said cam surface being generally arcuate in contour.

7. In combination, a load carrying and dumping assembly including a support and a body tiltably mounted on said support, and means for tilting said body, comprising a lever rotatably mounted upon said body, a power source movably mounted within said assembly, and pivotal means for connecting it to said lever and for thereby tilting said lever, and a fulcrum member on said support, the connections between the lever and the body and between the lever and the power source being relatively spaced, said second connection, when the parts are in initial position with the body lowered, being located at a level above said first connection, a portion of the lever more remote from the power source than said first connection being provided with a cam surface which is initially opposed to the fulcrum member, said fulcrum member being located on the side of said first connection opposite to the power source, the length of said lever and cam surface being less than the distance traveled by the lever with the body in the course of the normal lifting excursion of the body, whereby the lever is withdrawn from contact with said fulcrum member during a portion of the dumping movement of said body.

8. In combination, a load carrying and dumping assembly including a support and a body tiltably mounted on said support, and means for tilting said body, comprising a lever rotatably mounted upon said body, a power source movably mounted within said assembly, and pivotal means for connecting it to said lever and for thereby tilting said lever, and a fulcrum member on said support, the connections between the lever and the body and between the lever and the power source being relatively spaced, said second connection, when the parts are in initial position with the body lowered, being located at a level above said first connection, a portion of the lever more remote from the power source than said first connection being provided with a cam surface which is initially opposed to the fulcrum member, said fulcrum member being located on the side of said first connection opposite to the power source, the length of said lever and cam surface being less than the distance traveled by the lever with the body in the course of the normal lifting excursion of the body, whereby the lever is withdrawn from contact with said fulcrum member during a portion of the dumping movement of said body, said lever being generally triangular in form.

WILLIAM C. ANTHONY.